J. W. COMER.
PROTECTIVE SHOE FOR PNEUMATIC TIRES.
APPLICATION FILED OCT. 19, 1915.
1,253,154. Patented Jan. 8, 1918.
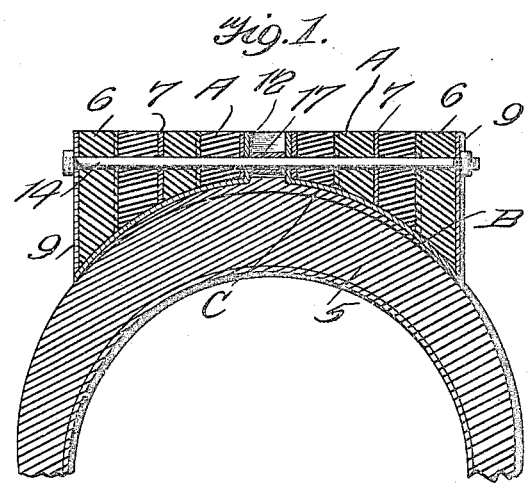
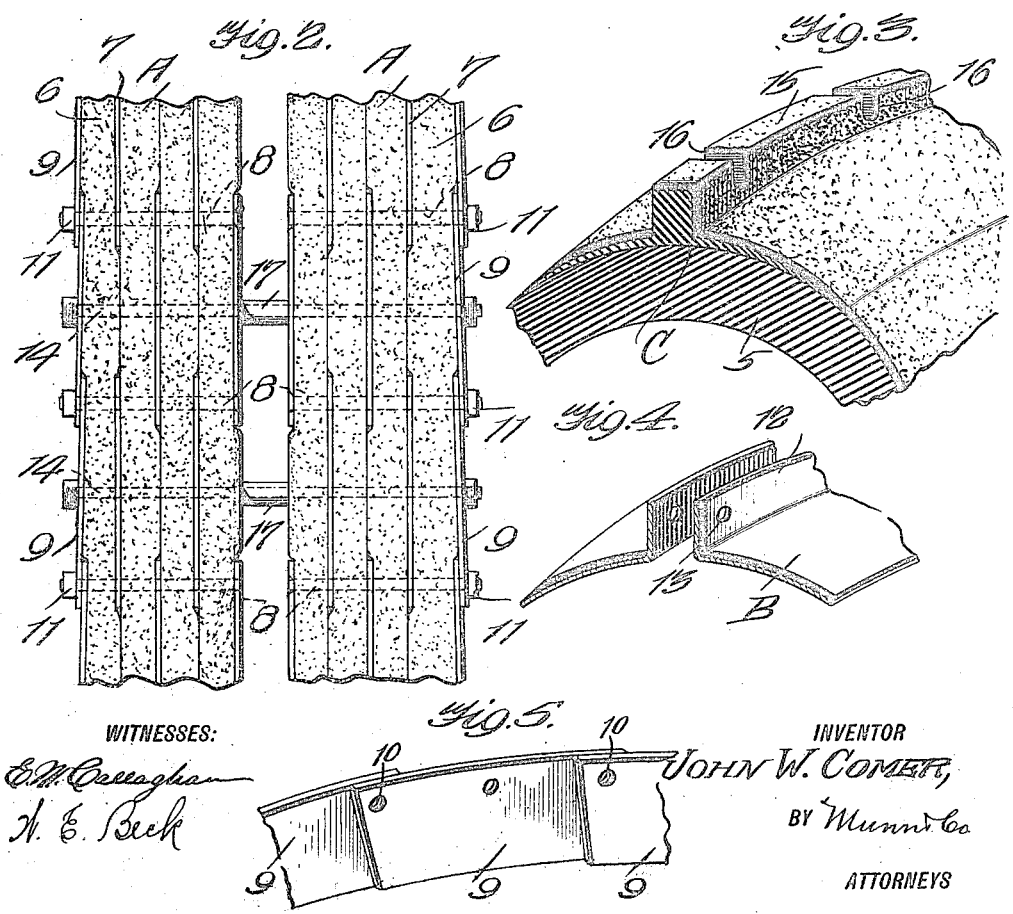
WITNESSES:
INVENTOR
John W. Comer,
BY Munn & Co
ATTORNEYS

UNITED STATES PATENT OFFICE.

JOHN W. COMER, OF CHICKASHA, OKLAHOMA.

PROTECTIVE SHOE FOR PNEUMATIC TIRES.

1,253,154.   Specification of Letters Patent.   Patented Jan. 8, 1918.

Application filed October 19, 1915. Serial No. 56,759.

*To all whom it may concern:*

Be it known that I, JOHN W. COMER, a citizen of the United States, and a resident of Chickasha, in the county of Grady and State of Oklahoma, have invented a certain new and useful Improvement in Protective Shoes for Pneumatic Tires, of which the following is a specification.

One of the principal objects of my present invention is to provide an improved protective or puncture-proof shoe or tread for resilient, particularly pneumatic, tires, in which resistance to wear, blow-out tendencies, and punctures are combined with qualities of flexibility, road adherence, and compensation for expansion and contraction of the parts.

A further object of the invention is to provide an improved device of the class described which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawing in which like characters of reference indicate like parts throughout the several figures, of which—

Figure 1 represents a vertical sectional view taken transversely through a protective shoe constructed according to my invention, showing the same as in place upon a tire.

Fig. 2 represents a fragmentary view in plan, of the tread members.

Fig. 3 represents a view in perspective of the cushion or band with which the device is connected, showing the same in place on a tire.

Fig. 4 represents a fragmentary view in perspective of the tread plates.

Fig. 5 represents a fragmentary perspective view of one of the segmented rings which comprise the outer edges of the tread members.

The invention contemplates the provision of chain-like resilient tread members adapted to be connected together and to rest against tread plates which surround the tire circumferentially thereof and which rest against a cushion or band having a tongue extending between the tread plates and coöperating with the bolts or other means, used in connecting the tread members, in preventing relative creeping movement of the tread device and tire.

Referring more particularly to the drawing, a pneumatic tire is indicated at 5, and at A are indicated the tread members proper. The latter each comprises a plurality of rings 6 of rubber composition or other suitable resilient material, alternating with series of curved metallic or other suitable plates 7. The plates in each series are spaced apart as indicated, and the plates in alternate series are arranged in staggered relation. These plates are of a curvature longitudinally conforming to the curvature of the tread member, and are of a depth equal to the depth of the adjacent portions of rings 6 between which they occur. The ends of plates 7 in the different series overlap as indicated, and are provided with openings for the reception of bolts or other suitable fastening means 8 which extend transversely through the plates and through the rings 6 for binding the elements of the tread member together. This plan of construction is followed out as the tread member is built up from the innermost plate, until the desired width of tread member has been obtained. The outer edges of the tread members are each defined by a chain or segmented ring comprising a plurality of curved plates 9 having overlapping ends provided with registering openings 10 through which the outer ends of the fastening means 8 extend. After the various elements of the tread member have been assembled, they are pressed together in any desirable manner, so that the interstices occurring between the plates in each series, are filled by the material of which the resilient rings 6 are composed, so that a solid, smooth tread surface is thus provided. The desired compression may be obtained by tightening the nuts 11 provided on the outer ends of bolts 8, or if other fastening devices are used in lieu of the bolts, by compressing the members in suitable manner and then finally securing the fastening means.

Each of the tread members A is adapted to rest against one of the tread plates B. The latter are transversely curved to conform with the transverse curvature of the surface of the tire against which they are to rest, and at their inner edges are provided with outwardly extending flanges 12. The latter are provided at spaced intervals with registering openings 13 through which tie rods 14 are adapted to pass. These rods also extend through both of the tread members A and through the central portion of the plates 7 in the alternate series of the entire series. The outer ends of the tie rods 14 extend through the central portion of the plates 9 as shown, and the rods may, if desired, be headed at one end and at their opposite ends be threaded for the reception of nuts whereby they may be suitably tightened. The said plates are each of a width substantially coincident with the width of the tread member which rests against it, and against the outer surface of the plate rests the inner surface of the tread members. In order that this may be accomplished, the inner surfaces of the tread members are concaved to the proper extent.

Arranged between the tread plate B and the tire 5 is a cushion or resilient band C. The band tapers off toward its lateral edges, and gradually merges with the outer surface of the tire. This band may, if desired, be formed on the tire when the same is made, or if applied to tires already in use, may be either vulcanized or otherwise secured onto the tire or simply placed against the same. The band is provided with an outwardly extending tongue or flange 15 which extends upwardly between the flanges 12 of the tread portion B. This tongue is provided at spaced intervals with recesses 16 through which the tie rods 14 pass. Upon these rods between the flanges 12 are arranged spacer sleeves 17, which rest within the recesses 16. The band C, made preferably of suitable resilient material, thus acts as a cushion for the tread plate B and for the tread surface of the tire 5, and it also acts as a means for locking the tread device and tire against relative creeping movement. From the construction of the device as set out, it will be seen that the disposition of the elastic or resilient materials relative to the metallic portions of the device, will allow for contraction and expansion of the metal without materially altering the shape or proportions of the device, and without placing strain upon any one portion thereof. The tread members A, while being flexible and thus capable of closely following the contour of the road, are at the same time exceedingly strong and durable, and the disposition of the curved plates 7 will provide a substantially anti-skid tread, so that the device will closely adhere to the roadway and will grip the surface thereof.

Although I have described the preferred embodiment of my invention, I may desire to make such changes in the construction, combination, and arrangement of parts thereof, as do not depart from the spirit of the invention and the scope of the appended claims.

I claim:—

1. A device of the class described, including a pair of spaced tread plates of a transversely concavo-convex formation surrounding a tire circumferentially thereof, and each having a radial flange formed at its inner end, a plurality of resilient rings arranged upon each tread plate, curved metallic plates disposed between the resilient rings and in spaced relation to each other, the rings and curved metallic plates increasing in thickness toward the outer edges of the tread plates, the curved metallic plates having overlapping ends, connecting means extending through the resilient rings and overlapping ends of the plates, and tie rods extending through the central portions of alternate plates and through the rings and the said flanges for connecting the members together.

2. In a device of the class described, the combination with a tire, of a resilient band extending circumferentially around the tire and merging at its edges with the surface of the tire, said band including an integral resilient tongue having notches arranged therein, and tread members bearing against the band on opposite sides of the tongue and having connecting means engaging in the notches in the tongue.

JOHN W. COMER.

Witnesses:
D. C. NEWMAN,
F. C. HALL.

Copies of this patent may be obtained for five cents each, by addressing the "Commissioner of Patents, Washington, D. C."